United States Patent
Lundquist et al.

(10) Patent No.: US 11,483,393 B1
(45) Date of Patent: Oct. 25, 2022

(54) APPARATUS AND METHOD FOR PASSIVE DETECTION OF MIDDLEBOXES WITHIN COMPUTER NETWORKS

(71) Applicant: Cpacket Networks Inc., San Jose, CA (US)

(72) Inventors: Sheng Lundquist, San Jose, CA (US); Douglas Cooper, Lake Oswego, OR (US); Ron Nevo, Portland, OR (US)

(73) Assignee: Cpacket Networks Inc., San Jose, CA (US)

( * ) Notice: Subject to any disclaimer, the term of this patent is extended or adjusted under 35 U.S.C. 154(b) by 79 days.

(21) Appl. No.: 16/986,914

(22) Filed: Aug. 6, 2020

(51) Int. Cl.
*H04L 67/14* (2022.01)
*H04L 69/16* (2022.01)
*H04L 67/1001* (2022.01)

(52) U.S. Cl.
CPC .......... *H04L 67/14* (2013.01); *H04L 67/1001* (2022.05); *H04L 69/16* (2013.01)

(58) Field of Classification Search
None
See application file for complete search history.

(56) References Cited

U.S. PATENT DOCUMENTS

2010/0235909 A1* 9/2010 Eynon .................. G06F 21/552
726/22
2010/0257092 A1* 10/2010 Einhorn ............... G06Q 40/025
705/38
2011/0277034 A1* 11/2011 Hanson ............... H04L 63/1433
726/25
2015/0244594 A1* 8/2015 Kay ..................... H04L 43/045
370/252

FOREIGN PATENT DOCUMENTS

EP         1920216 A2  *  5/2008  .......... G01C 21/3667

* cited by examiner

*Primary Examiner* — Schquita D Goodwin
*Assistant Examiner* — Ishrat Rashid
(74) *Attorney, Agent, or Firm* — Cooley LLP

(57) ABSTRACT

A non-transitory computer readable storage medium has instructions executed by a processor to receive network session information from network monitoring devices distributed throughout an enterprise network. The network session information characterizes communications between a client device within the enterprise network and a server external to the enterprise network. The network session information is transformed into vectors of network communication session parameters. The vectors are combined into different time series of data. A similarity measure is computed between the different time series of data to detect unique sessions between the client device and a middlebox network device within the enterprise network or unique sessions between a middle box network device within the enterprise network and the server. The unique sessions are evaluated to infer relationships between networked devices within the enterprise network. A visualization of the relationships to characterize enterprise network topology is supplied.

14 Claims, 7 Drawing Sheets

APPARATUS AND METHOD FOR PASSIVE DETECTION OF MIDDLEBOXES WITHIN COMPUTER NETWORKS

FIELD OF THE INVENTION

This invention relates generally to computer networks. More particularly, this invention is directed toward techniques for passive detection of middleboxes within computer networks.

BACKGROUND OF THE INVENTION

A middlebox is a physical or virtual network device that serves as an intermediary for network traffic. A middlebox achieves some functionality outside of just forwarding traffic; the functionality typically relates to security or performance. The functionality may relate to transforming, inspecting, filtering or manipulating packet traffic. Examples of middleboxes include load balancers, firewalls, Network Address Translators (NATs), Wide Area Application Services (WAAS) and proxies. A network topology within an organization typically consists of multiple middleboxes between a frontend client and a backend or external server.

Some middleboxes can have a single IP address within the network, while others can have multiple IP addresses on the server and client sides. Networks that contain middleboxes can be difficult to troubleshoot, since they have more points of failure. The additional points of failure are a result of having more hops to follow when tracing Layer 4 network traffic, such as TCP or UDP sessions. Middleboxes can create bottlenecks and can have configuration issues.

It remains a challenge to automatically detect middlebox devices within networks. Automatic detection of these devices relieves a network administrator of the burden of identifying and specifying middleboxes within a network, especially when the network topology changes within an organization. Current solutions for automatic detection of middleboxes use active detection methods by sending known traffic signals through the network for detection. This approach increases traffic and therefore strains the network.

Therefore, there is a need to identify middleboxes and characterize them in a network topology without utilizing active detection techniques that strain network resources.

SUMMARY OF THE INVENTION

A non-transitory computer readable storage medium has instructions executed by a processor to receive network session information from network monitoring devices distributed throughout an enterprise network. The network session information characterizes communications between a client device within the enterprise network and a server external to the enterprise network. The network session information is transformed into vectors of network communication session parameters. The vectors are combined into different time series of data. A similarity measure is computed between the different time series of data to detect unique sessions between the client device and a middlebox network device within the enterprise network or unique sessions between a middle box network device within the enterprise network and the server. The unique sessions are evaluated to infer relationships between networked devices within the enterprise network. A visualization of the relationships to characterize enterprise network topology is supplied.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
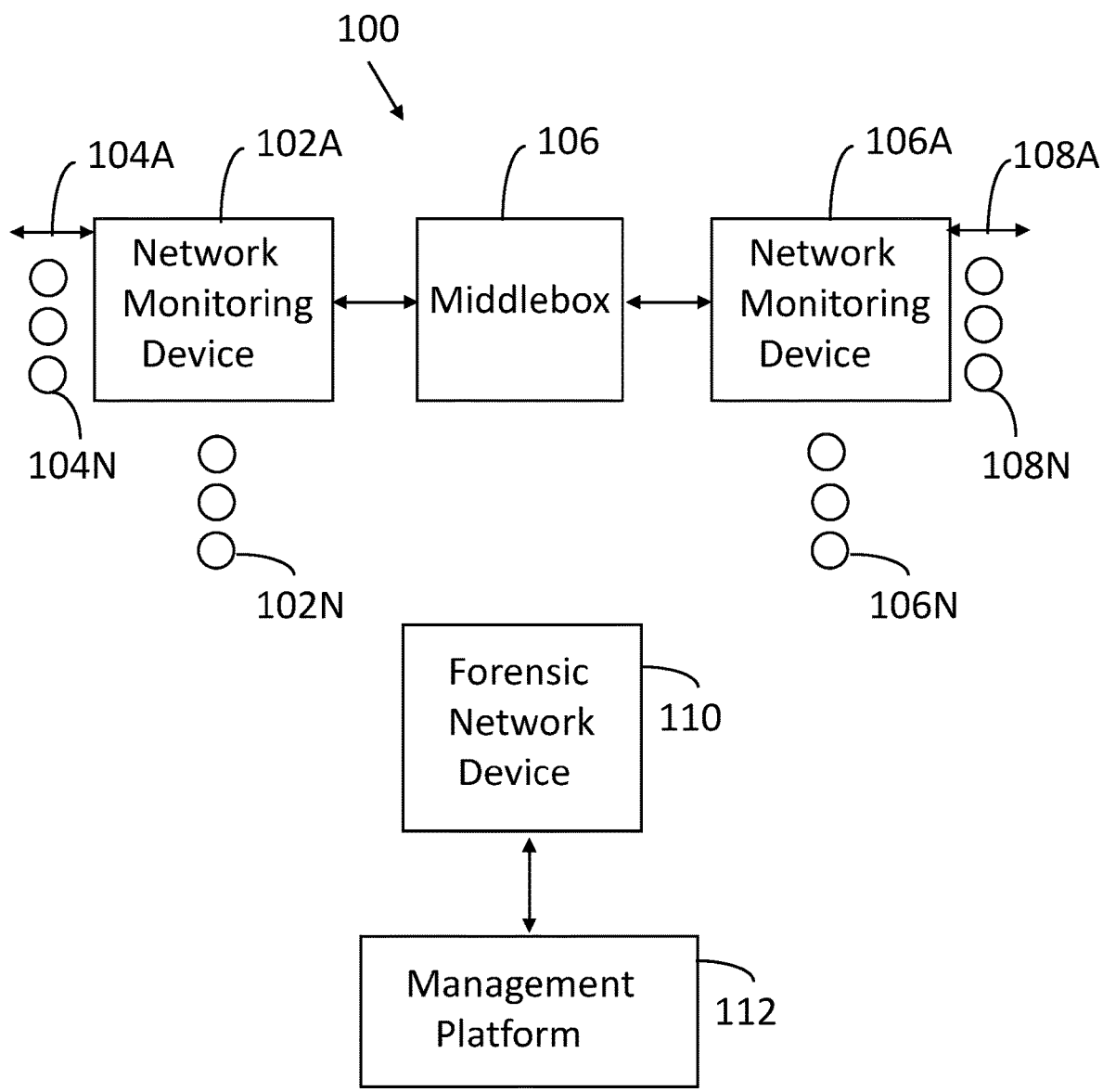
FIG. 1 illustrates a network configured in accordance with an embodiment of the invention.

FIG. 1 illustrates a system 100 for network monitoring and network analysis, in accordance with an embodiment of the invention. The system 100 includes network monitoring devices 102A-102N on the ingress side of a middlebox 106 and network monitoring devices 106A-106N on the egress side of machine 106. The network traffic that is monitored and analyzed by the network monitoring devices 102 may enter the network monitoring devices 102 through interfaces 104A-104N (or interfaces 108A-108N for network monitoring devices 106A-106N). After monitoring and analysis by the network monitoring devices, the network traffic may exit the devices through the interfaces if the interfaces are bidirectional, or through other interfaces (not shown) if the interfaces are unidirectional. Each of the devices may have a large number of high-capacity interfaces, such as 32 10-Gigabit network interfaces.

The network monitoring devices 102A-102N, 106A-106N are connected to a forensic network device 110. The forensic network device 110 processes information from opposite sides of machine 106 (i.e., from the network monitoring devices 102A-102N and from the network monitoring devices 106A-106N) to correlate traffic flows on opposite sides of machine 106.

In one embodiment, the forensic network device 110 is connected to a management platform 112. The management platform 112 may be used to perform additional traffic analytics and provide visualizations of network activity.

U.S. Pat. No. 9,407,518 (the '518 patent), which is owned by the current applicant, discloses a network monitoring device that may be configured in accordance with embodiments of the invention. The contents of the '518 patent are incorporated herein by reference.

Figure 2:
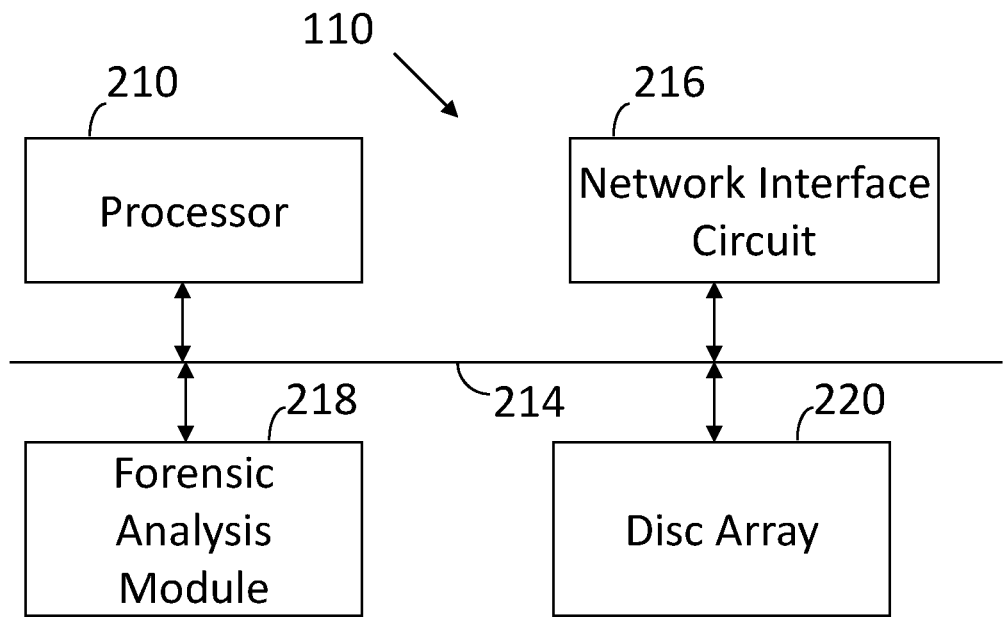
FIG. 2 illustrates a forensic network device configured in accordance with an embodiment of the invention.

FIG. 2 illustrates an embodiment of the forensic network device 110. The device 110 includes a processor 210 connected to a network interface circuit 216 via a bus 214. The network interface circuit 216 provides connectivity to a network hosting the devices of FIG. 1. A disc array 220 is also connected to the bus 214. Random access memory stores a forensic analysis module 218 with instructions executed by processor 210. The disc array 220 stores packets at line rate. The forensic analysis module 218 includes instructions executed by the processor to perform port forwarding, aggregation, replication, balancing and filtering. The forensic analysis module 218 also supports correlation of network traffic flows on opposite sides of a networked machine to passively identify middleboxes. That is, middleboxes are identified by passively observing network traffic flow, in contrast to prior art techniques that identify middleboxes by injecting additional traffic into a network.

The forensic network device 110 is in network communication with the management platform 112.

Figure 3:
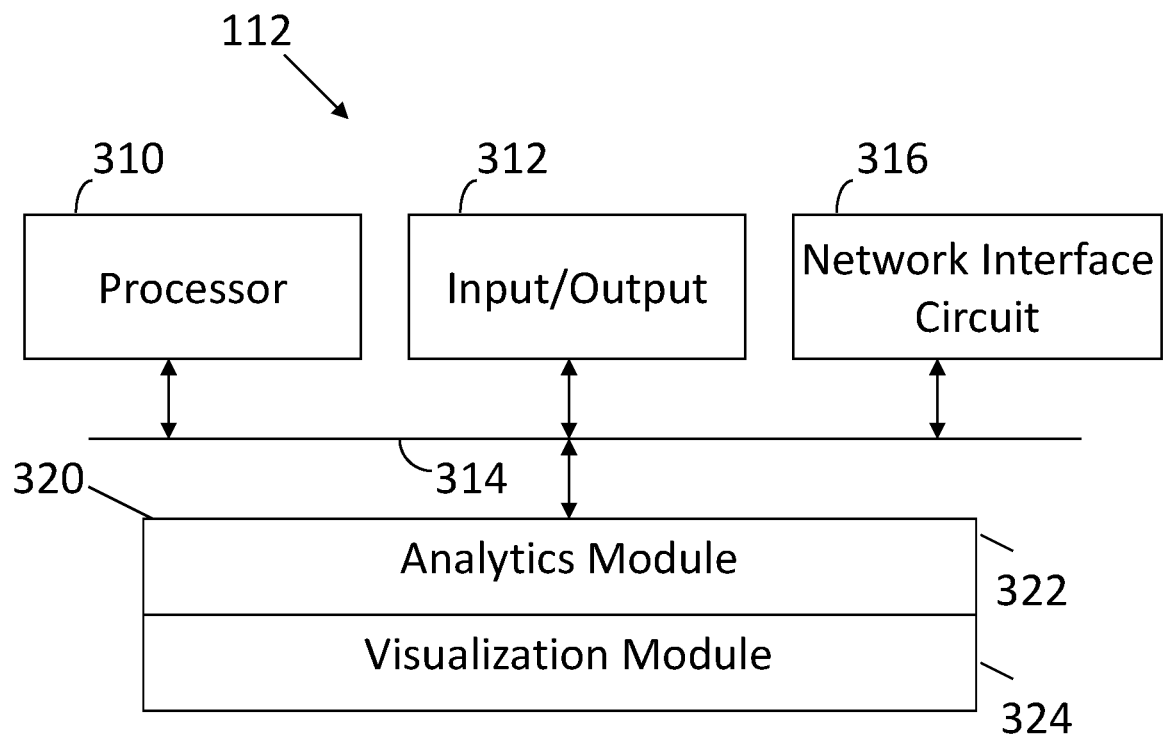
FIG. 3 illustrates a management platform configured in accordance with an embodiment of the invention.

FIG. 3 illustrates a management platform 112 that may be used in accordance with an embodiment of the invention. The management platform 112 may include a processor 310 connected to input/output devices 312 via a bus 314. A network interface circuit 316 is also connected to the bus 314 to provide connectivity to the network hosting the devices of FIG. 1. A memory 320 is also connected to the bus 314. The memory 320 stores instructions executed by the processor 310. In one embodiment, the memory 320 stores an analytics module 322 with instructions executed by the processor 310 to consolidate middlebox information deduced from the network monitoring devices 102A-102N, 108A-108N and forensic network device 110. A visualization module 324 is used to consolidate and report information. The visualization module 324 provides an interactive visualization of monitored networks and detected middleboxes. This helps network administrator personnel map the path within a network from frontend clients to backend servers for troubleshooting and monitoring.

The network monitoring devices 102A-102N, 108A-108N and forensic network device 110 are used to obtain a small window of high-resolution per-second data for detecting middleboxes. The management platform 112 is used for low-resolution aggregated data to produce statistics for visualization. The high resolution per-second data is used for middlebox detections. The data may include client IP address and port, server IP address and port and other flow key performance indicators (KPIs) including, but not limited to:
  Timing of packets
  Traffic throughput
  Session start/end times
  Number of active sessions
  Time To Live (TTL) in the IP packet header
  Sequence number in the TCP packet header
  Per millisecond microburst data which includes
    when traffic exceeds some predefined threshold
    the first millisecond which packets exceed some predefined threshold
    maximum per millisecond burst rate each second This high-resolution data is collected regularly for a small window of time. In some instances, middlebox detection can be achieved with as little as two minutes of data gathered once a day. The collected data is organized into individual sessions, defined as unique 5-tuples: client IP address, client port, server IP address, server port, and IP protocol. A subset of the collected data is organized into a time series, collected at per-second intervals. In one approach, the following information is used for detection:
  The time series of sessions initiated.
  Cumulative number of packets seen from the beginning of the session to the current second.
  The number of packets sent in the current seconds (i.e., the change in cumulative number of packets per second)
  A time series of binary values denoting if the session was communicating in that second.

The management platform 112 collects low resolution aggregated data. This data comprises statistics between unique client and server devices with corresponding IP addresses, collected continuously and aggregated at low resolution (e.g., aggregations of data in minutes). The data collected corresponds to any aggregation (e.g., average, deviation, minimum, maximum, median, quartiles) of various statistics used for visualization, including, but not limited to:
  Data throughput (e.g., packets)
  Latency
  Active sessions
  Dropped packets The middlebox detection algorithm aims to match sessions that have similar traffic characteristics across time. For detecting middlebox devices, a few assumptions are made about the collected data and behavior of such devices.
  The network links on both sides of a middlebox are being monitored.
  At any given moment, there exists no more than one session with the same unique (client:port, server:port, protocol) identification.
  The data was preprocessed to remove duplicate data (such as sessions captured from different capture devices)

The high resolution time series features are used to compare all pairs of sessions captured:

$$s_{i,j} = \sum_{t}(x_{i,t} x_{j,t})/N_{i,j}$$

The similarity S between the time series vectors $x_i$ and $x_j$ indexed at time t is computed via a dot product between the two vectors, with a normalizing variable N.

If pairs of time series data are compared naively, the similarity metric (i.e., the dot product of the two vectors) will bias towards time series vectors with higher magnitudes (i.e., sessions with higher amounts of traffic), even if the vectors do not match well. It is advantageous to have the final similarity score to be bounded between 0 and 1. Accordingly, each pair of vectors per comparison is normalized by the maximum L2 norm of the vectors:

$$N_{i,j} = \max\left(\sum_{t} x_{i,t}^2, \sum_{t} x_{j,t}^2\right)$$

The result of the above computation is a set of similarity matrices, one for each individual feature. Similarities between all features are averaged. Pairs of sessions are ranked based on this score.

Figure 4:
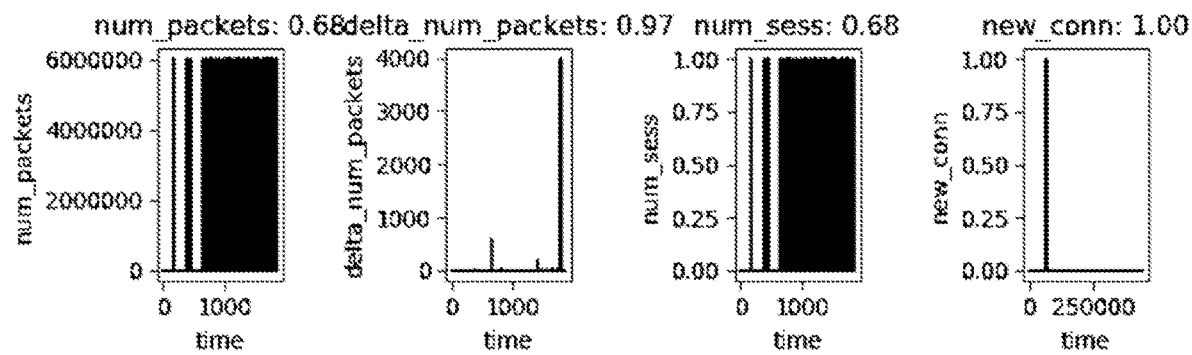
FIG. 4 illustrates a similarity score computation for two network communication sessions.
Figure 4:
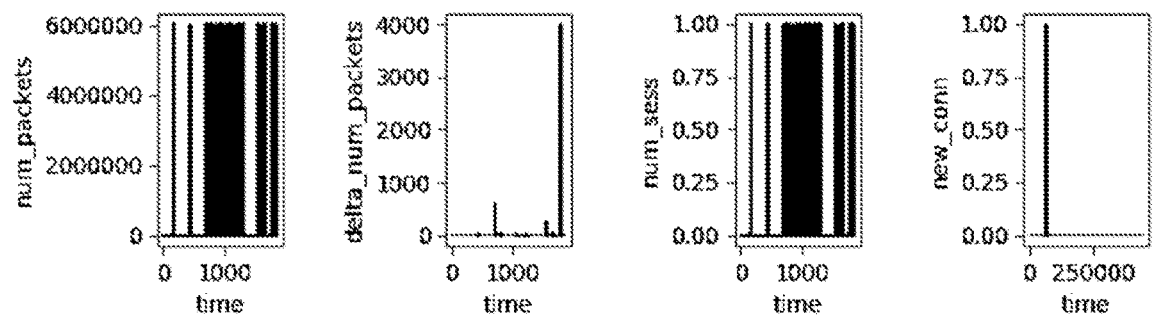

FIG. 4 shows an example of matching two sessions. A scaled dot product is computed between pairs of time series feature vectors between the sessions, such that a similarity value is computed for each of the four features shown. The similarity scores are averaged across features. From left to right, the features used are the cumulative number of packets seen since the beginning of the session, the number of packets sent in the current second, whether the session was sending packets that second, and the start time of the session.

Given a collection of matching sessions with a similarity score, a user adjustable threshold for detection is defined. With this collection of matching sessions, patterns for different types of detections are identified. The time series processing is typically performed by the forensic network device 110, but may also be performed by the management platform 112. Similarly, proxy detection based upon the time series processing may be performed by the forensic network device 110 and/or the management platform 112.

Figure 5:
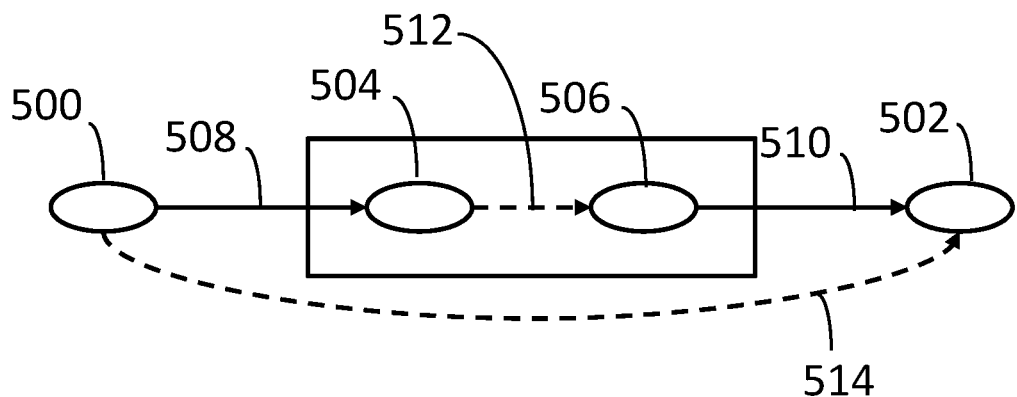
FIG. 5 illustrates session matching for proxies in accordance with an embodiment of the invention.

FIG. 5 illustrates proxy detection in accordance with an embodiment of the invention. Client machine 500 is in communication with a server 502. A first proxy server 504 and a proxy client 506 (a single proxy device with a client endpoint and a server endpoint) represents hops from the client 500 to the server 502. Solid lines 508 and 510 represent connections identified by the forensic network device 110. Line 512 represents an inferred connection between proxies identified by the forensic network device 110 and/or the management platform 112. Similarly, line 514 is an inferred connection between the client 500 and server 502 identified by the forensic network device 110 and/or the management platform 112.

If the pair of sessions contains unique client IP addresses and unique server IP addresses, the matching pair traffic is communicating through a proxy. The timestamp of the two matching sessions is compared to see which session was created first. The server of the first session and the client of the second session is set to be the detected proxy server and client respectively. Note that the proxy server and client IP addresses need not be unique.

Throughout the network, the proxy can be detected multiple times as the network routes traffic from multiple clients to multiple servers through a single proxy. The number of detections for each unique proxy server/client pair is counted and ranked based on the count for a detection confidence measure. As an additional confidence measure, the count is normalized by dividing over the total number of sessions seen using this server/client pair. These confidence measures may be compared to a threshold, allowing the user to adjust the ratio of false positives to false negatives in detections.

Figure 6:
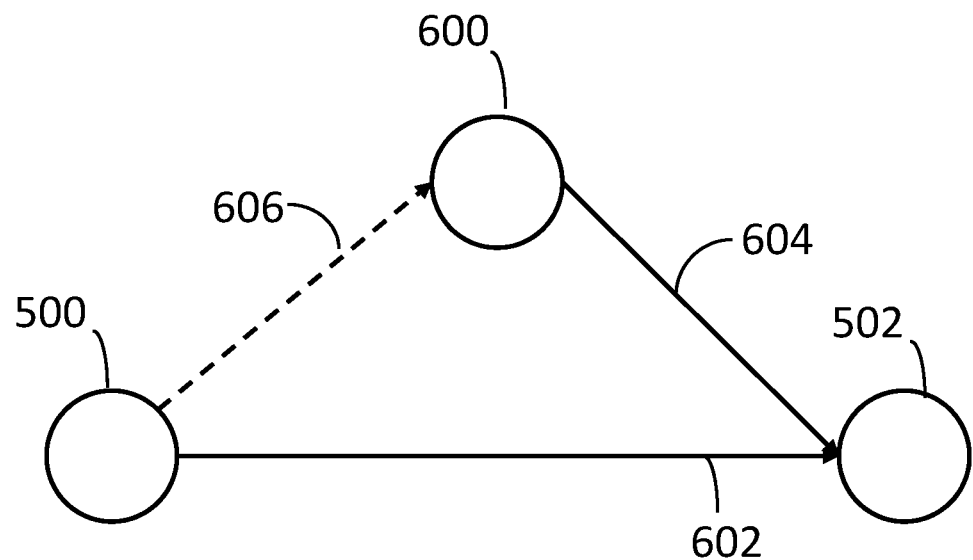
FIG. 6 illustrates session matching for Network Address Translators (NATs) in accordance with an embodiment of the invention.

FIG. 6 illustrates NAT detection in accordance with an embodiment of the invention. The figure illustrates a client 500, server 502 and detected NAT 600. The solid lines 602, 604 denote sessions that were detected to be matching within the network, and the dotted line 606 denotes inferred connection between the client 500 and the transparent NAT 600. Detected matches are typically identified by the forensic network device 110 and inferred connections are typically identified by the management platform 112, but either device can be used for either operation.

NATs differ from proxies due to the one-to-one mapping between packets. Specifically, a transparent NAT is detected by finding matching sessions between two pairs of endpoints: one from the client to the server, and one from the NAT to the server. These two sessions share a single backend server. Given this pattern of matching sessions, timestamps of when the two sessions were created are compared. The latter session's client is taken to be the NAT endpoint. A frontend connection is inferred between the frontend client and the NAT.

Similar to proxies, the number of total detections per NAT endpoint is counted. NAT detections are ranked by the number of detections and by normalizing this number over total sessions as a confidence measure. The resulting detections (in the case of a NAT and all other detections) are (1) a list of endpoints detected as middleboxes, and (2) a list of matching sessions that correspond to a detection.

Some situations require additional processing. Using the number of detections as a confidence measure will bias detections based on heavily used proxies. Underused proxies will still be reported as a low confidence detection. The system searches for near identical traffic, which could be an issue if traffic is significantly delayed due to processing at the middlebox or if the middlebox appends or adds packets. However, middleboxes typically forward traffic on millisecond timescales. In addition, the technique is quite robust to slight differences in traffic between the two matching sessions.

Some features might be more useful in certain networks than others. One solution is to weigh individual features either through user feedback or fine tuning to put more weight on certain features. Since there is a matching of traffic patterns between sessions, there can be false positives when an application uses similar sessions between a client and a server (e.g., multiple sessions are scheduled at a specific time with similar signatures).

Embodiments of the invention use several post-processing methods to improve the accuracy of the detection. For example, Low confidence detections are filtered against a threshold.

Two sessions that match for proxy detection which has both clients and/or servers in the same subnet are marked as "unsure", as it's unlikely for a proxy to point back into the same subnet.

Any proxies with captured communication between the detected proxy client/server pair are likely to be false positives.

The Time To Live (TTL) and/or the TCP sequence number may be used to help confirm or refute the hypothesis that a session passes through a proxy or NAT.

User feedback may be incorporated to identify and mark false positives and negatives.

Visualizing networks in a graph format allows a user to quickly gain insight into networks. In addition, interactive and dynamic visualizations allow users to intuitively focus on specific aspects of the data. This combined with network detection allows network administrators to quickly troubleshoot and act on potential problems that arise within the network.

One example of using the visualization to gain insights from network data is through using the results of the detection operation. Specifically, by using the list of matching sessions gathered from detection, a path of sessions coming from a frontend client to a backend server through any detected middleboxes can be inferred. This connects otherwise disjoint endpoints together through a proxy, as shown in FIG. 7, or highlight specific sessions through a NAT, as shown in FIG. 8.

Figure 7:
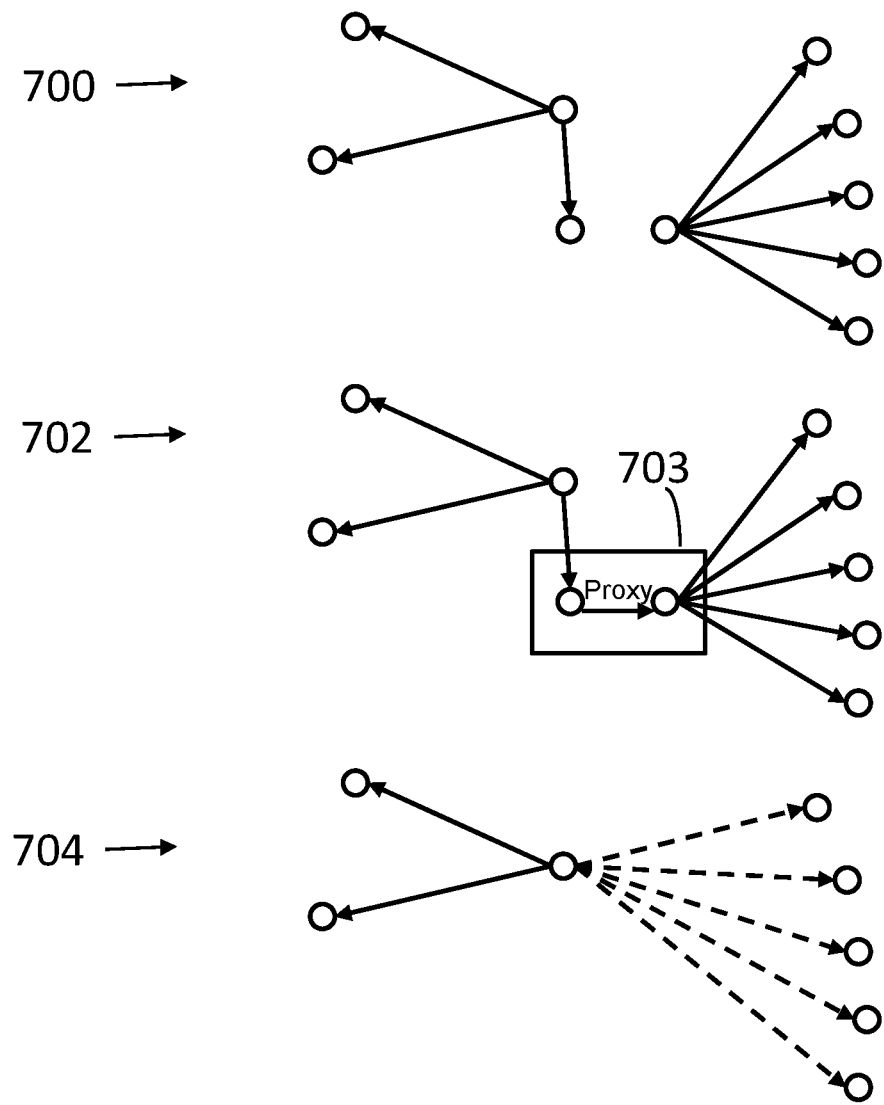
FIG. 7 is a visualization of endpoints through a detected proxy, which is supplied in accordance with an embodiment of the invention.

FIG. 7 is an example visualizing paths from a client node through a detected proxy to various backend servers. Circles denote individual devices, each with a unique IP address. Arrow points from the client to the server. The dashed lines denote inferred connections. In region 700, endpoints are disjoint from captured sessions. In region 702, detected proxy 703 infers a connection between the proxy server and client, connecting the disjoint endpoints. Region 704 shows logical connections drawn between clients and servers.

Figure 8:
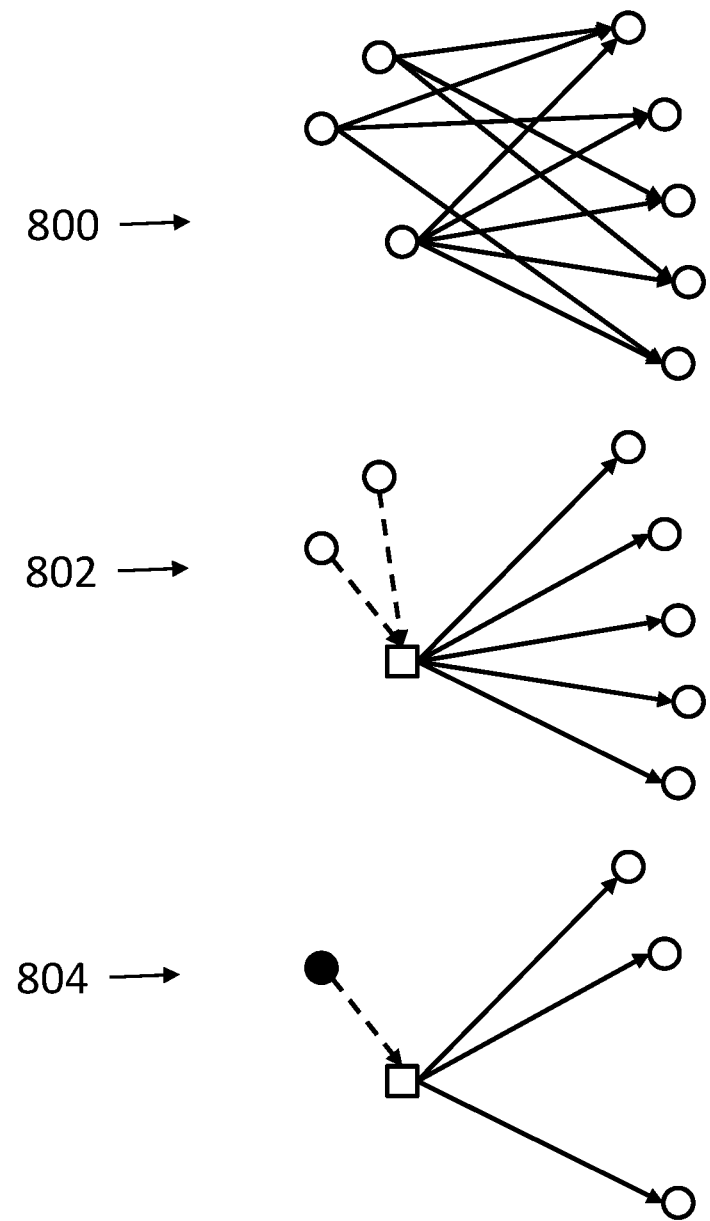
FIG. 8 is a visualization of endpoints through a detected NAT, which is supplied in accordance with an embodiment of the invention.

FIG. 8 is an example of visualizing paths through a detected NAT. Region 800 shows interconnected sessions from collected data. Region 802 shows with dashed lines that a connection is inferred between the client and a detected NAT (shown as a square). Region 804 shows selecting a node (shown as a filled circle) highlights the servers the client connects to through the NAT.

An advantage of viewing individual segments of a session through a middlebox is the ability to visualize various statistics of different segments. In particular, various statistics from network data can be represented visually, such as the lines in FIGS. 7 and 8, which may be color coded to represent the underlying data. For example, these paths can range from green to red based on the round trip time of sessions between the client and the server. This visualization is readily customizable to visualize other statistics such as latency, throughput, dropped packets, etc. In addition, the visualization is also able to quickly filter endpoints and sessions by a user specified filter based on these statistics.

Another example of gathering insights from visualization is through the use of geolocation software. Public IP addresses can be combined with a physical location represented on a map. This, in turn, highlights surprising endpoints from a geolocation point of view. The interactive visualization allows users to select an endpoint in question and visualize which local IP addresses are connected to the public. This workflow is illustrated in FIG. 9.

Figure 9:
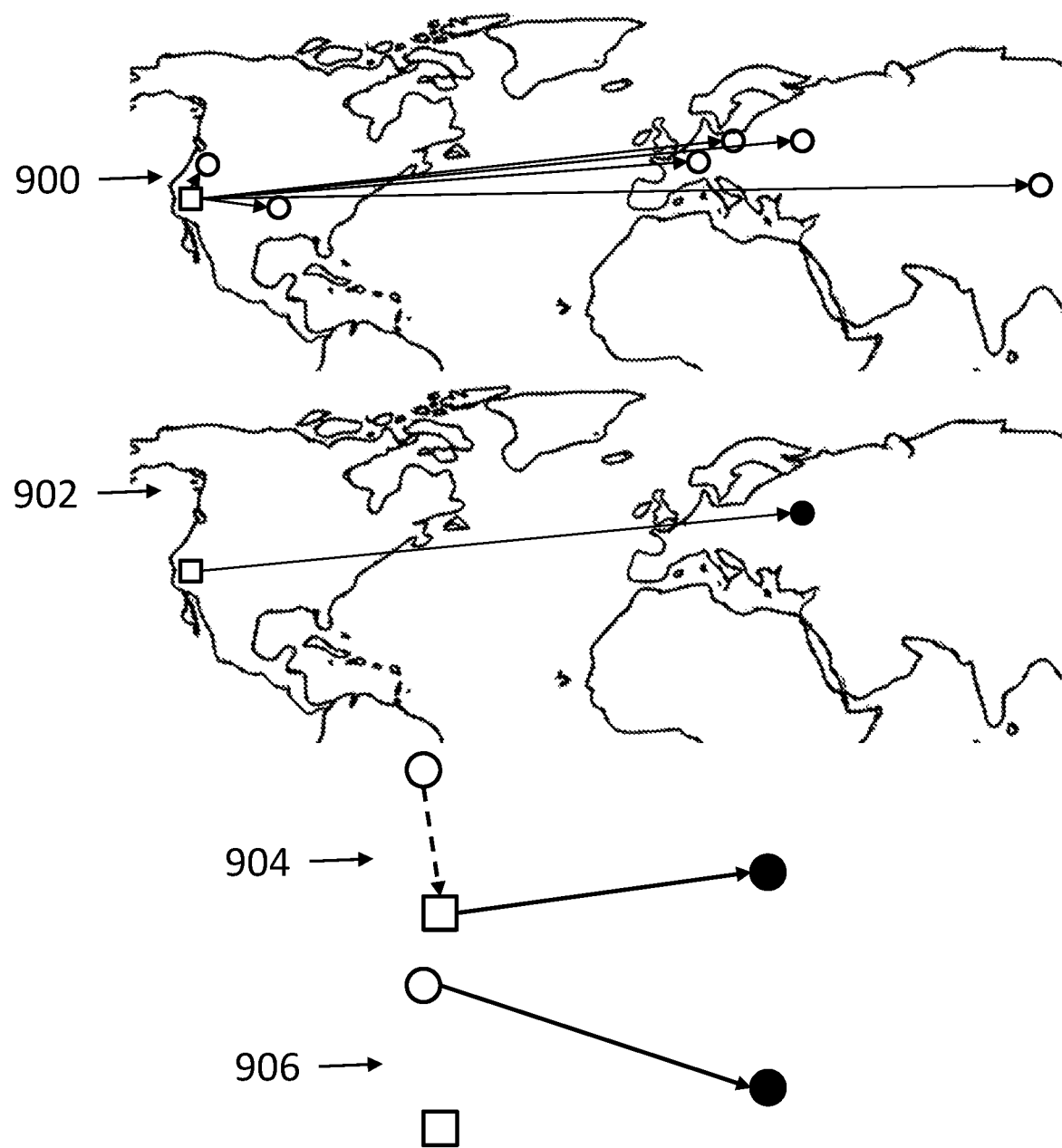
FIG. 9 is a geolocation visualization supplied in accordance with an embodiment of the invention.

FIG. 9 illustrates a geolocation map of endpoints. Region 900 shows public endpoints with geolocation overlaid on a map. Region 902 shows a user selected endpoint (filled circle) connected to a detected public NAT address (square). Region 904 shows the local IP address connecting to the server through the NAT. Region 906 is a logical view of the client (unfilled circle) connecting to the server (filled circle).

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
   receive network session information from network monitoring devices distributed throughout an enterprise network, the network session information characterizing communications between a client device within the enterprise network and a server external to the enterprise network;
   transform the network session information into vectors of network communication session parameters, including a client internet protocol address, a client port, a server internet protocol address, a server port, and an internet protocol;
   combine the vectors into different time series of data;
   compute a similarity measure between the different time series of data to detect unique sessions between the client device and a middlebox network device within the enterprise network and unique sessions between a middle box network device within the enterprise network and the server, wherein the similarity measure matches sessions that have similar traffic characteristics across time;
   evaluate the unique sessions to infer relationships between networked devices within the enterprise network, wherein the relationships are inferred without injecting additional traffic in the enterprise network; and
   supply a visualization of the relationships to characterize enterprise network topology.

2. The non-transitory computer readable storage medium of claim 1 further comprising instructions executed by the processor to count the unique sessions and assign each unique session a confidence measure.

3. The non-transitory computer readable storage medium of claim 2 further comprising instructions executed by the processor to compare the confidence measure to a threshold.

4. The non-transitory computer readable storage medium of claim 1 further comprising instructions executed by the processor to compute the similarity measure as a dot product between corresponding network communication session parameters in different time series.

5. The non-transitory computer readable storage medium of claim 4 further comprising instructions executed by the processor to compute the similarity measure using a normalizing variable.

6. The non-transitory computer readable storage medium of claim 1 wherein the network communication session parameters include on or more key performance indicators selected from: timing of packets, traffic throughput, session start time, session end time, number of active sessions, time to live in the internet protocol packet header, sequence number in the transmission control protocol packet header and per millisecond microburst data.

7. The non-transitory computer readable storage medium of claim 1 further comprising instructions executed by the processor to weight the network communication session parameters.

8. The non-transitory computer readable storage medium of claim 1 wherein the visualization shows relationships between the client device, middlebox network devices within the enterprise network topology and the server.

9. The non-transitory computer readable storage medium of claim 1 further comprising instructions executed by the processor to identify a network address translator by finding a first matching session between the client device and the server and a second matching session between the network address translator and the server.

10. The non-transitory computer readable storage medium of claim 1 wherein the middlebox network device is selected from a load balancer, a firewall and a network address translator.

11. The non-transitory computer readable storage medium of claim 1 wherein the visualization has coded indicia in connections between enterprise network devices to convey network performance data.

12. The non-transitory computer readable storage medium of claim 11 wherein the coded indicia indicates one or more of trip time, latency, throughput and dropped packets.

13. The non-transitory computer readable storage medium of claim 1 wherein the visualization is superimposed on a map.

14. The non-transitory computer readable storage medium of claim 1 wherein the visualization includes internet protocol address information.

\* \* \* \* \*